Feb. 17, 1970 R. C. BRACKEN ET AL 3,496,010
MACHINING SILICON COATING PRIOR TO VAPOR
DEPOSITION OF SILICON CARBIDE
Filed Oct. 5, 1966

INVENTORS
RONALD C. BRACKEN
RICHARD D. HUMPHRIES

V. Bryan Medlock, Jr.
ATTORNEY

United States Patent Office 3,496,010
Patented Feb. 17, 1970

3,496,010
MACHINING SILICON COATING PRIOR TO VAPOR DEPOSITION OF SILICON CARBIDE
Ronald Clay Bracken, Richardson, and Richard D. Humphries, Dallas, Tex., assignors to Texas Instruments Incorporated, Dallas, Tex., a corporation of Delaware
Filed Oct. 5, 1966, Ser. No. 584,493
Int. Cl. B44d 1/14; C23c 11/06
U.S. Cl. 117—66      4 Claims

ABSTRACT OF THE DISCLOSURE

A method of forming a body having a relatively hard, impervious, smooth surface by vapor depositing a layer of silicon on a graphite body, machining the silicon coating to a smooth finish, and subsequently chemically vapor depositing a layer of silicon carbide on the silicon coating.

---

This invention relates to a method for making hard surfaced bodies, and more particularly, but not by way of limitation, to a method of vapor depositing layers of relatively dense materials to obtain a hard surface having a desired finish.

In various industrial applications, it becomes desirable to coat a relatively soft material with a relatively hard covering or alternatively to provide a relatively hard body with a surface having a desired finish. For example, in some applications it may be desirable to have a component which possesses a relatively dense or hard surface, such as a silicon carbide surface, but which has a less dense substrate, such as graphite. In other applications, it may be desirable to provide a relatively dense body such as silicon carbide with a smooth or polished surface. An example of both of the mentioned applications is in the production of suction box covers for Fourdrinier machines where a relatively dense silicon carbide surface having a smooth finish is desired to promote the long life of the cover under the abrasive action of a Fourdrinier wire screen which is supported by and travels over the top of the suction box at relatively high speeds.

One conventional technique for preparing a suction box cover of silicon carbide is to prepare a form of silicon carbide particles which is then pressed and sintered into a final shape. As previously mentioned, the more polished and smooth the surface over which the Fourdrinier wire screen will travel, the less will be the resistance to travel and the less will be the wear of the wire. It is very difficult by sintering techniques to obtain a silicon carbide suction box cover which has a smooth, mirror-like finish, which is desired. Conventional techniques require the polishing of the sintered silicon carbide cover by use of a diamond wheel or the like requiring a great deal of time and effort rendering the production of suction box covers expensive.

This invention provides a method for producing bodies, such as suction box covers, which have substrates of varying degrees of hardness and smooth, mirror-like surfaces of either silicon or silicon carbide without requiring protracted and expensive grinding and polishing of silicon carbide.

In one form the method may be described as one for making a body having a relatively hard impervious surface, which comprises the step of vapor depositing a layer of silicon on a graphite body. In yet another form the method includes the step of machining the silicon layer deposited on the graphite body to obtain a desired finish.

In yet another form, the method contemplates the steps of forming a body having a relatively hard impervious surface by vapor depositing a layer of silicon on a silicon carbide body followed by machining of the silicon surface to obtain the desired finish. The method also contemplates coating the silicon deposited on the silicon carbide body with a layer of silicon carbide which because of machining of the silicon upon which it is deposited will require little or no polishing, thus providing a body having a surface with a desired finish which may be produced relatively inexpensively.

To be more specific, reference is made to the drawings in which.

Figure 1:
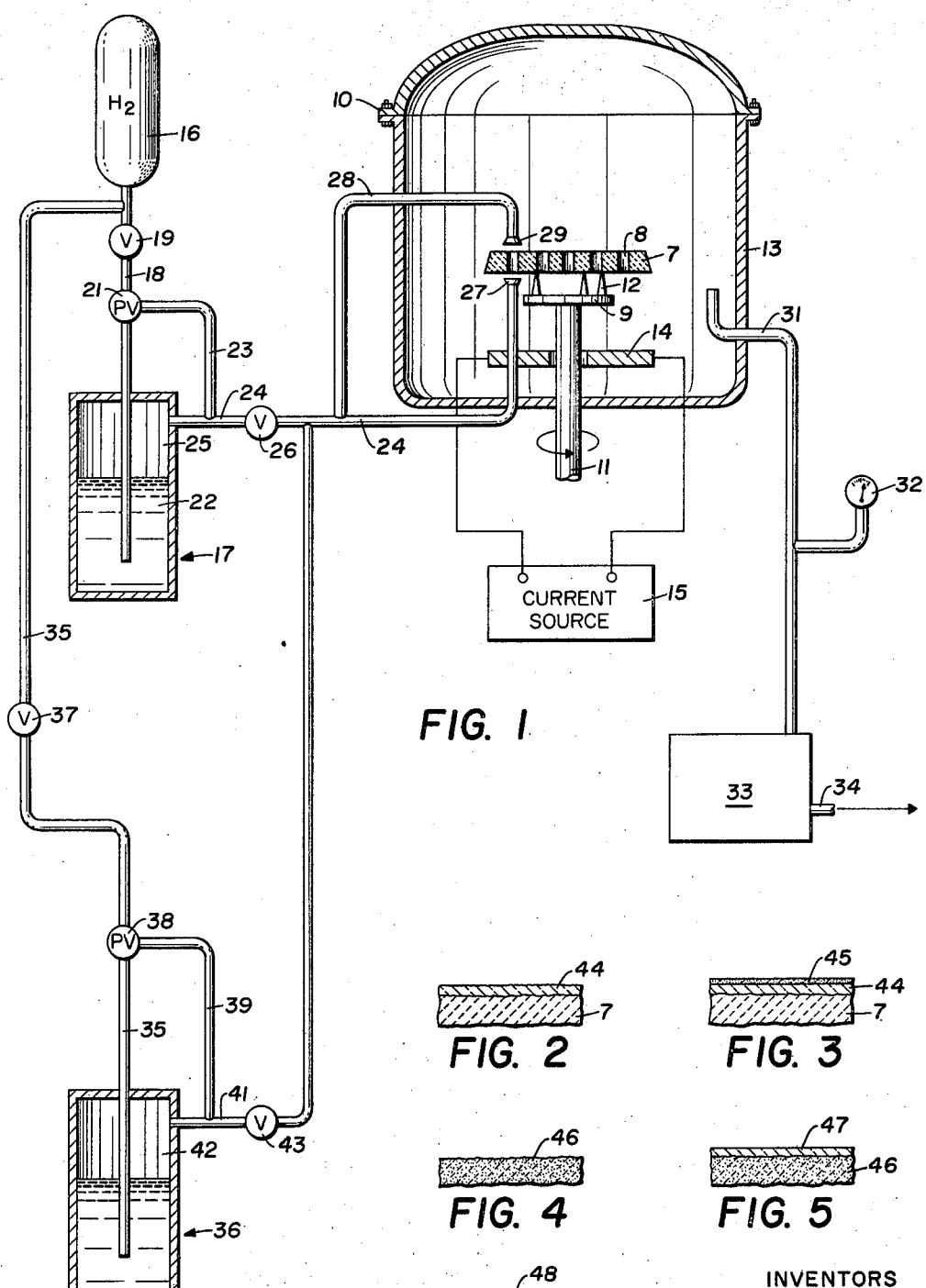
FIGURE 1 is a schematic diagram of suitable apparatus for carrying out the invention.

With reference to FIGURE 1, a graphite substrate 7 having the form of a conventional suction box cover and thus being provided with a plurality of apertures 8 is suspended on a three-spiked base 9 which includes an integral rotatable shaft 11 driven by conventional power means (not illustrated). The spikes 12 of base 9 contact a minimum area on the graphite body and space the remainder of base 9 out of proximity with the graphite body 7 to permit free circulation of a gas around substrate 7. Base 9 supports graphite body 7 within a reaction chamber 13 which is provided with suitable access means such as a bolted fiange means 10 between top and bottom halves of the chamber and which may be provided with suitable insulation (not illustrated). Disposed around shaft 11 and supported within reaction chamber 13 is a resistive heating element 14 disposed beneath and axially spaced from the graphite substrate 7. The resistive heating element 14 is connected to a suitable variable current source 15 to permit regulation of the amount of heat input to the reaction chamber 13, and thus control of the temperature within the reactor which may be gauged by an optical pyrometer (not illustrated) or the like. The heating element 14 preferably has a configuration corresponding to that of the substrate 7 so as to promote uniform heating of the substrate 7. A system for injecting gaseous reactants into the chamber 13 includes a hydrogen pressure tank 16 and a material container 17. Tank 16 and container 17 communicate through conduit 18 which has interposed therein a valve 19 and a proportioning valve 21. Valve 21 permits proportioning of the hydrogen between conduit 18, which discharges below the level of liquid 22 in container 17, and conduit 23 which communicates with exhaust conduit 24. Exhaust conduit 24 communicates the vapor space 25 in container 17 through a valve 26 to a nozzle 27 which discharges proximate the bottom of substrate 7. Conduit 24 also serves to communicate vapor space 25 with conduit 28 which discharges through a second nozzle 29 disposed proximate the top surface of substrate 7.

The gaseous reactants introduced into chamber 13 may exist through conduit 31 which discharges past a pressure gauge 32 into manostat 33 used for controlling pressure in reaction chamber 13. Manostat discharges through conduit 34 to a siutable exhaust system.

Hydrogen tank 16 also communicates through conduit 35 with a second liquid container 36. Interposed in conduit 35 is a valve 37 and a proportioning valve 38, which like valve 21, proportions the hydrogen flow between that portion of conduit 35 discharging into container 36 and conduit 39. Conduit 39 discharges into conduit 41 which communicates with the vapor space 42 in the container 36. Conduit 41 serves to communicate the vapor space 42 through valve 43 with conduits 24 and 28 which discharge through nozzles 27 and 29, respectively, as described above.

Thus, hydrogen contained in pressure tank 16 may be either communicated through material container 17 into reaction chamber 13 or be communicated through material container 36 into reaction chamber 13. While the particular system illustrated utilizes two nozzles, namely nozzles 27 and 29, other nozzles could be added to the system if desired, or a single nozzle could be employed though at least two are preferred.

The present invention may be utilized to cover a relatively soft body with a moderately hard coating. Specifically, a graphite body or the like may be coated with a layer of silicon as illustrated by the following example.

EXAMPLE 1

The equipment illustrated in FIGURE 1 is utilized. The material container 17 is partially filled with silicon tetrachloride, valves 37 and 43 closed, and valves 19 and 26 opened to permit hydrogen in tank 16 to communicate with material container 17. The proportioning valve 21 is adjusted to direct the entire hydrogen flow through material container 17 so that the gaseous stream exiting from container 17 through conduit 24 will be saturated with silicon tetrachloride. Before gas flow is initiated, a graphite substrate having a density of 1.6 grams/cm.$^2$ is heated to about 1000° C. by application of voltage from current source 15. As soon as the substrate has reached the desired temperature, approximately 7.5 liters/min. of hydrogen is bubbled through container 17 and discharged onto the graphite substrate through nozzles 27 and 29. The gaseous mixture of silicon tetrachloride and hydrogen, which contains about 5–9 mole percent silicon tetrachloride is circulated through reactor 13 for about 45 minutes to deposit a uniform layer of silicon on the graphite substrate which layer will be approximately 625 microns thick. Manostat 33 is set to maintain the pressure in reactor 13 at atmospheric which will be indicated by pressure gauge 32.

Figure 2:
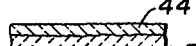
FIGURE 2 is a partial cross-sectional view of a graphite body upon which has been deposited a silicon layer.

In FIGURE 2 there is represented a portion of the surface of the body formed by the deposition. A uniform layer of silicon 44 has formed on the graphite substrate 7. Silicon layer 44 may be machined, for example, by polishing with an aluminum oxide or silicon carbide wheel to smooth the silicon surface to give it a mirror-like finish use as a suction box cover, if desired.

If a relatively soft body is desired with a very hard surface, such a body may be prepared as described in the following example.

EXAMPLE 2

A silicon coated body is prepared as in Example 1. The silicon surface 44 is polished to a mirror-like finish. Valves 19 and 26 are closed, valves 37 and 43 opened, and hydrogen circulated through conduit 35 into material container 36 which is partialy filled with methyl trichlorosilane. The silicon coated body is heated to a temperature of from 900° C. to about 1400° C. before introduction of the gaseous stream through nozzles 27 and 9. After the silicon coated body has been uniformly heated to the desired temperature, hydrogen from pressure tank 16 is passed through proportioning valve 38 into container 36 where methyl trichlorosilane vapor will be entrained in the hydrogen. The hydrogen-methyl trichlorosilane gaseous stream then passes through conduit 41 where it is united with pure hydrogen bypassing through conduit 39 before it is discharged into reaction chamber 13. Valve 38 provides a means for controlling the ratio of hydrogen to methyl trichlorosilane in the process stream. The mole ratio of the hydrogen to the methyl trichlorosilane should be from about 50:1 to 4:1 which ratio may be determined by a thermal conductivity cell (not illustrated). The flow rate of the process stream may be monitored by suitable flow meters (not illustrated) and controlled by valve 43. As the process stream leaves valve 43, it is divided and passes through the nozzles 27 and 29 where it is directed onto the hot silicon layer 44. The stream will deposit silicon carbide upon the surface 44 after which the unused portion of the gases will be discharged through conduit 31.

In order to afford a better understanding of the silicon carbide coating, specific properties of silicon carbide coatings produced by the present process are hereafter presented. A relatively wide range of process variables including the mole ratios, process stream flow rate and therefore flow velocities, temperature of the substrate, and duration of the run will vary the thickness and chemical and physical properties of the silicon carbide coating within the following ranges. Runs have been conducted using hydrogen flow rates of 20 liters/min. to 100 liters/min. depending upon the system. Durations of the runs have been varied from 0.05 to 8.7 hours at temperatures from 1180° C. to 450° C. Silicon carbide coatings having thicknesses from 3 to 115 mils have been produced. The silicon carbide coatings have beta crystalline structure, are very dense, and are essentially fluid-impervious. The silicon carbide coatings have ranged from stoichiometrically pure silicon carbide to silicon carbide having as much as 0.89% free carbon or as much as 36.5% free silicon as a second phase element, depending upon the excess material present and the amount.

Although methyl trichlorosilane was specified in the above described example, it will be appreciated that various other materials can be employed, as will be described hereafter.

Figure 3:
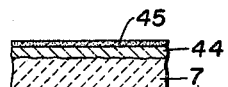
FIGURE 3 is a partial cross-sectional view of a graphite body upon which has first been deposited a layer of silicon upon which, after machining of the silicon, has been deposited a layer of silicon carbide.

FIGURE 3 represents a portion of the substrate 7 upon which has been deposited a silicon layer 44 followed by deposition of the silicon carbide layer 45.

Since the silicon layer was prepolished before deposition of the silicon carbide layer, very little, if any, polishing of the silicon carbide layer will be necessary to provide the mirror-like finish desired for applications such as suction box covers. Thus, the time required to provide a body with a desired mirror-like finish and the expense incident thereto is greatly reduced.

If a body is desired having a relatively hard strong core with a moderately hard coating, it may be produced in the manner described in the following example.

EXAMPLE 3

Figure 4:
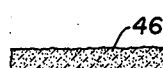
FIGURE 4 is a partial cross-sectional view of a silicon carbide body.
Figure 5:
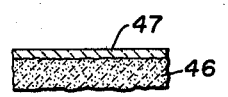
FIGURE 5 is a partial cross-sectional view of a silicon carbide body upon which a layer of silicon has been deposited.

The body produced in Example 1 is placed in reaction chamber 13 and raised to a temperature of 1430° C. for ten minutes or more depending upon the size and geometry of the body to permit infiltration of the silicon into the graphite body and reaction between the infiltrating silicon and graphite to produce a silicon carbide body. FIGURE 4 illustrates a portion of the surface of body 7 indicating its transformation into a silicon carbide form 46. The temperature of the body 46 was lowered to 1000° C. and a layer of silicon was deposited on the body 46 in the manner described in Example 1 followed by polishing in a conventional manner to provide a body having a surface resembling that which is illustrated in FIGURE 5. In FIGURE 5, a silicon carbide substrate has deposited thereon a silicon layer 47. Thus, there is provided a relatively hard body onto which has been deposited a relatively hard surface of silicon which may be easily polished. Obviously, the same body could have been prepared by starting with a sintered silicon carbide body followed by coating with silicon.

If a relatively hard strong body having a relatively hard surface is needed, it may be prepared in the manner described in the following example.

EXAMPLE 4

Figure 6:
FIGURE 6 is a partial cross-sectional view of a silicon carbide body upon which a layer of silicon has been deposited followed by a layer of silicon carbide after machining of the silicon layer.

The specimen prepared in Example 3 is placed in the reaction chamber 13, and a layer of silicon carbide is coated thereon as described in Example 2. A small portion of the surface of such a body is illustrated in FIGURE 6 where the silicon carbide substrate 46 after coating of the silicon layer 47 thereon and polishing of layer 47 has been provided with a coating of silicon carbide 48 which will require little or no polishing due to the previous polishing of its substrate 47.

The time required to deposit the desired layer of silicon on a given graphite body will vary with the dimensions of the body, the temperature of the composition, and the amount of hydrogen and silicon halide being circulated through the reactor, all of which will be appreciated by those skilled in the art.

While silicon in the above examples is deposited from silicon tetrachloride, various silicon halides may be used. Equilibrium data for these halides, and thus the temperatures and pressures at which deposition may be effected, may be easily calculated by techniques such as those used by Lever, "The Equilibrium Behavior of the Silicon-Hydrogen-Chlorine System," page 460, IBM Research Journal (1964). The various silicon halides may be generally identified by the formula:

$$SiH_aX_b$$

where the integers $a+b=4$. These integers can assume any value between 0 and 4, and the subscript $a$ is an integer indicating the number of hydrogen atoms in the molecule. The subscript $b$ is an integer representing the number of halogen atoms needed to form the compound. In the deposition of silicon, it has been determined that deposition is preferably done between about 900° C. and 1300° C. and the mole ratio of hydrogen to silicon tetrachloride is maintained within the range over which deposition of silicon will occur, which may be easily determined by reference to equilibrium data found in Lever, "The Equilibrium Behavior of the Silicon-Hydrogen-Chlorine System," page 460, IBM Research Journal (1964).

While silicon fluorides (which term is used to include silicon-hydrogen-fluorine compounds) may be used, they are not preferred because of low heat of reaction. Also, silicon iodides (which term is used to include silicon-hydrogen-iodine compounds) may be used, they are not preferred because of their low vapor pressures. Also, while methyltrichlorosilane was specified in the above examples for use in the deposition of silicon carbide, it will be appreciated that various other materials can be employed to furnish the silicon and carbon without departing from the teaching of the invention. For example, the silicon carbide source may be single compounds, such as dimethyldichlorosilane, trimethylchlorosilane, tetramethylsilane, and other aliphatic and aromatic substituted halogenated silanes. Also, the silicon atoms and carbon atoms may be supplied in separate compounds. For example, the carbon atoms may be supplied by compounds such as methane, ethane, propane, benzene, toluene, xylene, ethylene, propylene, and other aliphatic and aromatic hydrocarbons, and the silicon atoms may be supplied by compounds such as silicon tetrachloride, silicon tetrabromide, silicon tetraiodide, or any one or more mono-, di- and tri-chloro-, bromo-, fluor- and iodo-silanes.

The silicon carbide coating prepared as described above is uniform, continuous reproduction of the surface of the substrate upon which it is deposited. Since silicon upon which the silicon carbide is coated can be relatively easily machined into a smooth mirror-like surface, the silicon carbide coated thereon will also be smooth and require little, if any, polishing. Since silicon is more easily polished than silicon carbide, the expense of providing a silicon carbide surface having a desired finish is substantially reduced.

While the method of the invention has been described in connection with the production of suction box covers, its application is not so limited as will be appreciated by those skilled in the art.

The properties of the two coatings, silicon and silicon carbide differ so that in some applications, for example, in providing a capstan-like spool over which thread used in various weaving processes may be passed, a body having a silicon surface may be adequate. For use as a suction box cover, a silicon carbide surface is preferred. Silicon carbide has a tensile strength between $31-55 \times 10^3$ p.s.i. while that of silicon is about $15 \times 10^3$ p.s.i., and thus in applications requiring the greater strength, silicon carbide will be preferred, all of which will be obvious to those skilled in the art after a reading of the foregoing.

What is claimed is:

1. A method of making a body having a relatively hard, impervious surface comprising the steps of:
   vapor depositing a layer of silicon on a graphite body,
   machining said layer of silicon to obtain a desired finish, and
   vapor depositing a layer of silicon carbide on said layer of silicon after machining thereof.

2. A method of making a body having a relatively hard, impervious, smooth surface comprising the steps of:
   vapor depositing a first layer of silicon on a graphite body;
   elevating the temperature of said body and silicon coated thereon to permit said silicon to infiltrate and react with said graphite to form silicon carbide;
   vapor depositing a second layer of silicon on the silicon carbide body;
   machining said second layer of silicon formed on the silicon carbide body to obtain a desired, smooth finish; and
   vapor depositing a layer of silicon carbide on said second layer of silicon after machining thereof.

3. A method for making a body having a relatively hard, smooth, impervious surface comprising the steps of:
   heating a graphite body to a temperature between about 900° C. and about 1300° C.;
   passing over said body, while said body is maintained between about 900° C. and about 1300° C., a gaseous deposition mixture of $H_2$ and $SiH_aX_b$ for sufficient time to form a layer of silicon on said body, where:
   X is a halogen,
   the subscript $a$ is an integer designating the number of hydrogen atoms in the molecule and the subscript $b$ is an integer representing the number of halogen atoms needed to form the compound;
   machining said layer of silicon to obtain a desired finish; and
   heating said graphite body and said layer of silicon to a temperature between about 900° C. and about 1400° C. and directing a stream of hydrogen, silicon-containing compounds, and carbon-containing compounds against said layer of silicon to obtain a deposit of silicon carbide thereon.

4. A method for making a body having a relatively hard, impervious, smooth surface comprising the steps of:
   heating a graphite body to a temperature within the range of from about 900° C. to about 1300° C. and depositing silicon thereon;
   elevating the temperature of said graphite body and silicon layer to a temperature greater than about 1430° C. and less than about 1850° C. for permitting said silicon layer to penetrate and react with said body;
   lowering the temperature of said silicon carbide body to a temperature between about 900° C. and about 1300° C.;

passing over said body, while maintained between about 900° C. and about 1300° C., a gaseous deposition mixture of $H_2$ and $SiH_aX_b$ for sufficient time to form a layer of silicon on said body, where:

X is a halogen, the subscript $a$ is an integer designating the number of hydrogen atoms in the molecule and the subscript $b$ is an integer representing the number of halogen atoms needed to form the compound;

machining said silicon layer formed on said silicon carbide body to obtain a desired finish; and heating said silicon carbide body and silicon layer to a temperature between about 900° C. and about 1400° C. and directing a stream of hydrogen, silicon-containing compounds, and carbon-containing compounds against the silicon layer to obtain a deposit of silicon carbide thereon.

References Cited

UNITED STATES PATENTS

| | | | |
|---|---|---|---|
| 3,140,193 | 7/1964 | Kane | 117—69 X |
| 3,164,489 | 1/1965 | Timper | 117—228 X |
| 3,307,254 | 3/1967 | Williams | 29—90 X |
| 3,329,527 | 7/1967 | Harris. | |
| 3,391,016 | 7/1968 | McCrary et al. | |
| 3,406,044 | 10/1968 | Harris | 117—106 |

ANDREW G. GOLIAN, Primary Examiner

U.S. Cl. X.R.

29—529; 117—69, 106; 264—162